United States Patent
Pirhonen et al.

(10) Patent No.: US 6,734,275 B2
(45) Date of Patent: May 11, 2004

(54) METHOD OF GLUING WOOD BASED MATERIALS

(75) Inventors: Salme Pirhonen, Sollentuna (SE); Benyahia Nasli-Bakir, Saltsjö-Boo (SE); Ingvar Lindh, Bromma (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/272,939

(22) Filed: Oct. 18, 2002

(65) Prior Publication Data

US 2003/0079832 A1 May 1, 2003

Related U.S. Application Data

(60) Provisional application No. 60/329,738, filed on Oct. 18, 2001.

(51) Int. Cl.[7] .................... C08G 14/04; C08G 14/68
(52) U.S. Cl. ................ 528/129; 528/155; 528/176; 528/256; 525/328.7; 525/328.8; 525/489; 525/501; 525/508; 428/505; 428/506; 428/511; 428/528; 156/335
(58) Field of Search .................... 528/129, 155, 528/176, 256; 525/328.7, 328.8, 489, 501, 568; 428/565, 566, 511, 528; 156/335

(56) References Cited

FOREIGN PATENT DOCUMENTS

| EP | 0277106 | 8/1988 | |
|---|---|---|---|
| EP | 0538687 A1 * | 10/1992 | ............ C08G/8/28 |
| SE | 505134 | 6/1997 | |

OTHER PUBLICATIONS

English language Abstract of EP 0538687.*
English language claims of EP 0538687 B1.*
M. Prestifilippo et al, "Low addition of melamine salts for improved UF adhesives water resistance"; Holz als Roh und Werkstoff 54 (1996), pp 393–398.
Derwent English language abstract of SE 505134.
English language version of Laid Open No. 1997–278855, Laid Open Date: Oct. 28, 1997 (Application No. 1996–121092, filed Apr. 17, 1996.
English language version of Laid Open No. 1977–5143, Laid Open Date: Apr. 25, 1977 (Application No. 1975–127479, filed Oct. 24, 1975).
English language abstract of J52051430; XP–002187543.

* cited by examiner

*Primary Examiner*—Duc Truong
(74) *Attorney, Agent, or Firm*—David J. Serbin

(57) ABSTRACT

The present invention relates to a method of gluing wood based materials by providing an adhesive system onto wood based materials followed by curing, the adhesive system comprises a urea based amino resin and a hardener composition, wherein the hardener composition comprises an acid and a phenolic resin. The invention also relates to an adhesive system and a hardener composition as well as wood based products obtained by the method or through the use of the adhesive system.

28 Claims, No Drawings

METHOD OF GLUING WOOD BASED MATERIALS

This application claims the befit of Provisional application Ser. No. 60/329,738 filed Oct. 18, 2001.

The present invention relates to a method of gluing wood based materials whereby a urea based amino resin is cured by a hardener composition comprising an acid and a phenolic resin. The present invention also relates to an adhesive system and a hardener composition. Furthermore, it also relates to a wood based product obtainable by the method. Finally, it relates to the use of an adhesive system for making a wood based product.

BACKGROUND

When gluing wood, it is common to use an adhesive system based on a curable resin, such as a formaldehyde resin, which, for example, can be an amino resin or a phenolic resin. Important properties of an adhesive include adhesive strength, curing time and temperature, water-resistance and emission of formaldehyde.

Urea based amino resins are condensates of carbonyl compounds, such as aldehydes, with urea or thiourea. Other compounds containing amino, imino or amide groups may also be co-condensed into the urea based amino resin. Mostly, urea based amino resins refer to condensates of formaldehyde and urea giving urea-formaldehyde ("UF"). Urea based amino resins are usually cured by using acidic hardener compositions. The water-resistance is moderate for UF resin based adhesives as compared with pure melamine-formaldehyde ("MF") resin based adhesives. Therefore, the use of UF resins is usually limited to indoor applications.

It is known to improve the water-resistance of UF resin based adhesives by adding different melamine based compounds. For example, an MF resin can be mixed into a UF resin thereby forming a melamine-urea-formaldehyde ("MUF") resin. Also, the addition of melamine powder to a UF resin improves the water-resistance of the adhesive bond. Furthermore, SE 505134 describes the use of melamine salts to improve the water-resistance of UF resins.

However, all the methods of improving the water-resistance above lead to slower curing than for the UF resin alone. The use of melamine powder in UF resins has limitations since the powder has a poor solubility in water. Solubility problems occur as well when using melamine salts in UF resins.

JP Laid Open No. 1997-278855, discloses a thermosetting resin composition comprising a UF resin having a molar F/U ratio of 2.5 to 6. This is the molar ratio formaldehyde to urea used when making the resin. At ratios of 2.5 or less, the UF resin is said to be remarkably poor in stability and having poor mixability with the phenolic resin. The problem solved is how to achieve a thermosetting resin composition, which is stable for a long time at room temperature.

However, it would be desirable to provide a method of gluing wood based materials, an adhesive system, and a hardener composition, which give water-resistant and fast curing adhesive bonds.

It is therefore an object of the present invention to provide a method for gluing wood based materials which provides fast curing and water-resistant adhesive bonds. It is another object of the present invention to provide an adhesive system, as well as a hardener composition intended for use in an adhesive system, which is fast curing and gives water-resistant adhesive bonds. Finally, it is an object of the present invention to provide a wood based product which adhesive bonds cure fast, and are water-resistant.

INVENTION

It has surprisingly been found possible to meet these objects by a new method of gluing wood based materials using a new adhesive system and a new hardener composition. The method according to the invention comprises gluing wood based materials by providing an adhesive system onto wood based materials followed by curing, the adhesive system comprising a urea based amino resin and a hardener composition, wherein the hardener composition comprises an acid and a phenolic resin, which is a resorcinol resin or a tannin resin, or a mixture thereof. The adhesive system according to the invention comprises a urea based amino resin and a hardener composition, wherein the hardener composition comprises an acid and a phenolic resin resin, which is a resorcinol resin or a tannin resin, or a mixture thereof, the molar ratio aldehyde to amino compound used when making the urea based amino resin is less than 2.4.

The hardener composition according to the invention comprises an acid and a phenolic resin, which is a resorcinol resin or a tannin resin, or a mixture thereof. The invention further relates to a wood based product obtainable by the method which can be a flooring material, plywood, a laminated beam and a fibre-, chip- or particleboard material. Finally, the invention further relates to the use of an adhesive system according to the invention for making a wood based product which can be a flooring material, plywood, a laminated beam and a fibre-, chip- or particleboard material. The present invention provides a hardener composition which is storage stable before mixing with a curable resin.

By the term "adhesive system", as used herein, is meant a curing formulation containing a curable resin and a hardener composition.

By the term "hardener composition", as used herein, is meant a composition, not intended to cure by itself, comprising a curing promoter intended to cure, or harden, a curable resin.

In the urea based amino resin of the invention, it is suitable that at least 30 mole % of the one or more amino compounds used when making the amino resin is urea or thiourea or derivatives thereof, preferably at least 50 mole %.

The combination of a urea based amino resin with a hardener composition according to the invention makes it possible to provide an adhesive system with similar curing time as an adhesive system comprising the amino resin and an acidic hardener without phenolic resin, at the same time the water-resistance is greatly improved.

Another advantage with the present invention is that urea based amino resins, having very low contents of free aldehyde, particularly UF resins having very low contents of free formaldehyde, can be used in order to achieve adhesive bonds with high water-resistance at short curing times. This makes it possible to provide an adhesive system that is fast curing, water-resistant and which also has very low emission of aldehyde, particularly formaldehyde.

The urea based amino resin used in the method and the adhesive system of the invention can be any urea based amino resin, such as urea-formaldehyde ("UF"), melamine-urea-formaldehyde ("MUF"), melamine-urea-phenol-formaldehyde ("MUPF"), thiourea resins, alkyl urea resins such as ethylene urea, and condensates of formaldehyde and urea together with other compounds containing amino, imino or amide groups such as thiourea, substituted urea, and guanamines. The preferred urea based amino resin is UF. The urea based amino resin is made by reacting an aldehyde and an amino compound. The "aldehyde to amino compound ratio", which is the molar ratio aldehyde to amino compound used when making the amino resin of the claimed adhesive system, is less than 2.4, preferably from about 0.5 to about 2.3, most preferably from about 0.7 to about 2. Optionally, fillers, thickeners or other additives, including aldehyde catchers, can be added to the amino resin. Examples of fillers are inorganic fillers such as kaolin and calcium carbonate or organic fillers such as wood flour, wheat flour, starch and gluten. Examples of thickeners are polyvinyl alcohol, and cellulose compounds such as hydroxy ethyl cellulose and carboxy methyl cellulose. Other additives can be, for example, polyols, polysaccharides, polyvinylalcohol, acrylates, and- styrene-butadiene polymers. Homopolymers or copolymers of vinylesters may also be used as components, such as vinyl acetate, vinyl propionate, and vinyl butyrate. These polymers may also comprise post-crosslinking groups. Also aldehyde catchers such as urea and guanamines may be added. If components, like fillers or other additives according to above, are present, their amount can usually be less than about 70 weight %, suitably from about 0.1 to about 70 weight %, preferably from about 1 to about 60 weight %, most preferably from about 5 to about 40 weight %.

Condensates of different phenolic compounds and aldehydes are referred to as phenolic resins. The phenolic compound can be phenol itself, polyhydric phenols, and aliphatically or aromatically substituted phenols. Examples of phenolic compounds are alkyl phenols such as resorcinol, alkyl resorcinol, cresols, ethyl phenol and xylenol, and also phenolic compounds of natural origin such as tannins, cardenol, and cardol. Examples of suitable aldehydes include formaldehyde, acetaldehyde, glutaraldehyde, propionaldehyde, n-butyraldehyde, isobutyraldehyde and furfural. As phenolic resins are herein also included tannins themselves, without having formed condensates with aldehydes. Examples of tannins are condensed tannins, such as bi-, tri, and tetraflavanoids, and further condensed flavanoids. The phenolic resin according to the present invention can be a resorcinol resin or a tannin resin, or a mixture thereof. The phenolic resin can exist as a solution in water, or alcohol such as ethanol. Tannins can also be present as solid materials. Suitably, the phenolic resin exists as an aqueous solution with varying dry content of resin. Suitably, the phenolic resin is a formaldehyde-based phenolic resin. Preferred formaldehyde based phenolic resins in the hardener composition are resorcinol-formaldehyde ("RF"), phenol-resorcinol-formaldehyde ("PRF"), and tannin-formaldehyde ("TF") resins. The most preferred being PRF. In the case of RF and PRF resins, the molar ratio of formaldehyde to total amount phenolic compounds (one or both of phenol and resorcinol) in the PRF resin, calculated as added when making the resins, can be from about 0.1 to about 2, suitably from about 0.2 to about 1.5, preferably from about 0.3 to about 1. The molar ratio phenol to resorcinol in the PRF resin, calculated as added when making the PRF resin, can be from about 0.02 to about 15, suitably from about 0.05 to about 10, preferably from about 0.1 to about 5, most preferably from about 0.2 to about 2. Alternatively, the PRF resin can be a substantially PF resin, containing substantially no resorcinol, of a resol type having resorcinol grafted onto it as terminal groups.

Examples of suitable acids include organic and inorganic protonic acids, acidic salts, and acid generating salts. As acid is also meant metal salts giving acidic reaction in aqueous solutions, also referred to herein as non-protonic acids. Examples of suitable non-protonic acids include aluminium chloride, aluminium nitrate and aluminium sulphate. Suitable organic protonic acids include aliphatic or aromatic mono-, di-, tri-, or polycarboxylic acids such as formic acid, acetic acid, maleic acid, malonic acid and citric acid. Also sulphonic acids such as para-toluene sulphonic acid, para-phenol sulphonic acid and benzene sulphonic acid are suitable. Inorganic protonic acids can be, for example, hydrochloric acid, sulphuric acid, nitric acid, phosphoric acid, boric acid, sulphamic acid and ammonium salts such as ammonium chloride and ammonium sulphate. Examples of acid generating salts are formiates and acetates such as sodium formiate, sodium acetate, ammonium formiate, and ammonium acetate. A strong acid such as hydrochloric acid or sulphuric acid may be combined with an alkyl amine in the hardener composition thereby forming an alkyl amine salt. The hardener composition may comprise more than one acid, for example, two, three or several acids. Also, the hardener composition may comprise a combination of both an organic acid and an inorganic acid. Suitably, the acid is soluble in the phenolic resin, and solutions of the phenolic resin. In some cases, one or more additives, which improve the solubility of the acid in the phenolic resin, are suitably used. Such additives can be polyglycols such as polyethylene glycol, polypropylene glycol, ketones such as acetone, and dialkyl ethers such as ethylene glycol monobutyl ether, diethylene glycol monobutyl ether, propylene glycol monomethyl ether, diethylene glycol monomethyl ether, and, dipropylene glycol monomethyl ether.

In a preferred embodiment of the invention, a combination of a UF resin (having a low F/U ratio) with a hardener composition comprising a PRF resin and para-toluene sulphonic acid (pTSA), gives an adhesive system which cures fast and which has high water-resistance. In another preferred embodiment of the invention, a combination of a UF resin with a hardener composition comprising a tannin resin and para-toluene sulphonic acid (pTSA), gives an adhesive system which cures fast and which has high water-resistance.

The hardener composition may, optionally, comprise fillers, thickeners or other additives. These can be inorganic fillers such as kaolin and calcium carbonate or organic fillers such as wood flour, wheat flour, starch and gluten. Examples of thickeners are polyvinyl alcohol, and cellulose compounds such as hydroxy ethyl cellulose and carboxy methyl cellulose. Other additives can be, for example, polyols, polysaccharides, polyvinylalcohol, acrylates, and styrene-butadiene polymers. Homopolymers or copolymers of vinylesters such as vinyl acetate, vinyl propionate, and vinyl butyrate, may also be used as additives, and also aldehyde catchers such as urea and guanamines.

The hardener composition should preferably be storage stable, meaning that substantially no curing of the phenolic resin should take place in the hardener composition itself. An indicator for storage stability is the degree of gelling, either occurring evenly throughout the hardener composition, or as lumps of gelled particles in the composition. Gelling throughout the composition gives an increased viscosity. The hardener composition is considered storage stable if it has not gelled according to the above and if it functions in the application equipment used for applying the composition onto wood based materials. The hardener composition according to the invention is suitably storage stable at room temperature (20° C.) for more than about two weeks, preferably more than about one month, most preferably more than about six months.

The content of phenolic resin in the hardener composition can be from about 1 to about 80 weight %, based on dry matter, suitably from about 5 to about 70 weight %, preferably from about 10 to about 65 weight %, and most preferably from about 20 to about 60 weight %. The content of the acid in the hardener composition depends on the original pH of the phenolic resin itself used in the hardener composition. The content of the acid, including its salts, in the hardener composition can be up to about 50 weight %, suitably from about 0.5 to about 50 weight %, preferably from about 1 to about 40 weight %, and most preferably from about 2 to about 30 weight %. If other components, like fillers or other additives, are present, their amount can usually be less than about 70 weight %, suitably from about 0.1 to about 70 weight %, preferably from about 1 to about 60 weight %, most preferably from about 5 to about 40 weight %. The pH of the hardener compositon is suitably from about 0 to about 6, preferably from about 0 to about 4, even more preferably from about 0.1 to about 3, most preferably from about 0.3 to about 2.

The pH of the adhesive system will effect the curing rate of the adhesive system and may be chosen thereafter. The pH of the adhesive system can be from about 0 to about 7, preferably from about 0 to about 5, and most preferably from about 0 to about 4.

Depending on the wood based materials to be glued as well as the way of providing the adhesive system onto the wood based materials, the preferred weight ratios of amino resin to phenolic resin may vary. If very high water resistance is needed, for example for plywood materials or laminated beams, more phenolic resin is used. The weight ratio amino resin to phenolic resin in the adhesive system can be from about 0.1 to about 30, based on dry matter, suitably from about 0.5 to about 20, and preferably from about 1 to about 15. In the case of flooring material, the most preferred ratio of amino resin to phenolic resin is from about 2 to about 10, based on dry matter.

The curing temperature, in the glue line, for the adhesive system of the present invention is suitably from about 0 to about 150° C. If no high frequency curing is used, the curing temperature is preferably from about 30 to about 120° C., most preferably from about 50 to about 100° C.

The wood based materials according to the method of the invention can be of any kind that can be joined by an adhesive system, including fibres, chips and particles. Suitably, the wood-based materials are layers in a flooring material such as parquet flooring, the layers in plywood, parts in laminated beams, or fibres, chips and particles for making fibre-, chip-, or particleboard material. Preferably, the wood-based materials are layers in a flooring material.

In the method of the present invention, the adhesive system can be provided by separately applying the amino resin and the hardener composition onto the wood based materials. Alternatively, the method of the invention can comprise mixing the amino resin and the hardener composition to form the adhesive system and then providing the adhesive system onto the wood based materials.

Separate application include, for example, application of the amino resin onto one or several wood based materials and application of the hardener composition onto one or several wood based materials onto which no amino resin have been previously applied. Thereafter, the wood based materials onto which only amino resin has been applied and the wood based materials onto which only hardener composition has been applied are joined together providing a mixing of the two components forming an adhesive system which can be cured. Separate application also include, for example, application of the amino resin onto one or several wood based materials and application of the hardener composition onto the same wood based materials. The amino resin and hardener composition may be applied completely onto each other, partially onto each other, or without being in contact with each other. The surface of the wood based material with both amino resin and hardener composition applied is thereafter joined with another surface of a wood based material, which also may have been applied with both amino resin and hardener composition, thereby providing a good mixing of the amino resin and the hardener composition forming an adhesive system which can be cured. Separate application of the amino resin and the hardener composition can be made in any order onto the wood based materials to be glued.

Suitable amounts of the components to be applied can be in the range of 100–500 g/m$^2$ depending, inter alia, on the feeding rate of a moving substrate.

The application of the amino resin and hardener composition, or the mixture of both, onto a wood based material can be made by using any suitable method known in the art, such as spraying, brushing, extruding, roll-spreading, curtain-coating etc. forming shapes such as droplets, one or several strands, beads or a substantially continuous layer.

In the case of gluing together wood materials in the form of fibres, chips or partides, the amino resin and the hardener composition is suitably applied as a mixture which coats the wood based materials with the adhesive system.

The wood based product according to the invention is suitably a laminated beam, plywood, a fibre-, chip- or particleboard, or a flooring material. Preferably, the wood based product is a laminated beam.

The invention will now further be described in connection with the following examples which, however, not should be interpreted as limiting the scope of the invention.

EXAMPLES

In the case of flooring material there has been no common standard used in Europe for measuring water resistance. However, there exist other standards such as the Japanese standard, JAS for flooring, 2000, which involves water exposure followed by measurement of delamination.

Example 1

A base material of fir (6 mm thickness) was glued together with a face layer of beech (3.8 mm thickness). A UF resin and a hardener composition of an adhesive system were separately applied in an amount of 170 g/m$^2$. The assembly was pressed at a temperature of 95° C. and a pressure of 0.7 MPa for 160 seconds. Test pieces of 75×75 mm were cut out which were conditioned in an atmosphere at 20° C. with a relative humidity of 65%, for 7 days. Thereafter, the test pieces were water-treated for 2 hours at 70° C. and then dried at 60° C. for 3 hours. The laminates were tested for delamination according to the Japanese standard, JAS for flooring.

A UF resin was tested with seven different hardener compositions: an aqueous solution of para-toluene sulphonic acid (pTSA), PRF resin and two different amounts of pTSA (the present invention), tannin and pTSA (the present invention), a mixture of PRF and tannin and pTSA (the present invention), MF resin and pTSA, and, PF resin and pTSA. The UF resin had a dry content of 65 weight % and an F/U ratio of 1.5. The PRF resin had a dry content of 55 weight % and the molar ratio formaldehyde to phenol and resorcinol when making the resin was 0.4. The P/R ratio was 1.3. The tannin was of a type extracted from Quebracho wood and present as a solid powder. The PF resin was of a resol type, having a dry content of 47 weight %.

TABLE 1

| Adhesive system | pTSA in hardener composition, % | Stability of hardener composition | Weight ratio UF to second resin | Delamination face, % |
|---|---|---|---|---|
| UF + pTSA | 6.4 | — | — | 56 |
| UF + (PRF + PTSA) | 6.4 | Excellent | 7 | 2 |
| UF + (PRF + pTSA) | 22.7 | Excellent | 9 | 0 |
| UF + (tannin + pTSA) | 22.7 | Excellent | 9 | 20 |
| UF + (75% PRF + 25% tannin + pTSA) | 22.7 | Excellent | 9 | 0 |
| UF + (MF + pTSA) | 6.4 | Insufficient (<24 hours) | —* | —** |
| UF + (PF + pTSA) | 27.8 | Insufficient (<1 week) | —* | —** |

*Due to the instability of the hardener composition, they were not mixed.
**The adhesive system was not tested Example 2

A melamine salt was used in a UF resin of the same type as in Example 1. The same experimental procedure was used as in Example 1, except that the pressing time was much longer, and the temperature slightly lower. The weight ratio UF resin to melamine formiate was 8.

TABLE 2

| Adhesive system | Curing temperature, °C. | Pressing time, s | Delamination face, % |
|---|---|---|---|
| UF + (melamine formiate + acid) | 90 | 600 | 57 |

It is concluded from Example 1 and 2 that:

The present invention gives a very high water-resistance.

Despite the longer pressing time, the use of melamine formiate shows inferior results than the present invention. In fact, the use of melamine formiate in a UF resin did not seem to have any effect to the water-resistance at all.

A MF resin is not stable enough to be used as a component in a hardener composition according to the present invention.

A PF resin of a resol type does not form a stable hardener composition.

Example 3

A UF resin (of the same type as in Example 1) was tested with a hardener composition comprising PRF and pTSA according to the invention and a conventional acid hardener. The emission of formaldehyde was measured according to an internal method (IAR 804, flask method). Three plies (150×150 mm) of a plywood beech core and birch veneers were glued together with 120 g/m2 of a mixture of a UF resin and a hardener composition according to above. The laminate was pressed at 90° C. for 90 seconds and subsequently conditioned at 20° C. at 65% relative humidity for one week. Pieces of 60×45 mm were cut out and put in a 0.5 chamber hanging above 50 ml of water. After 3 hours at 40° C. the content of formaldehyde in the water was measured.

TABLE 3

| Adhesive system | Formaldehyde emission |
|---|---|
| UF + add hardener | 6.0 |
| UF + (PRF + pTSA) | 3.3 |

It is concluded that the present invention gives lower emission of formaldehyde than when using a UF resin with a conventional hardener.

Example 4

UF resins with different amounts of free formaldehyde present in the resins were tested with a hardener composition comprising PRF and pTSA according to the invention and the procedure in Example 1.

TABLE 4

| | Molar ratio formaldehyde/urea | Free formaldehyde, % | Delamination face, % |
|---|---|---|---|
| UF1 | 1.5 | 0.18 | 6 |
| UF2 | 1.1 | 0.02 | 2 |

It is concluded that very good water-resistance is achieved at very short curing times also when a uf resin with very low contents of free formaldehyde is used.

What is claimed is:

1. A method of gluing wood based materials by providing a first and second component of an adhesive system, applying the two componeuts mixed or separately onto wood based materials followed by curing, the first component is a urea based amino resin and the second component is a hardener composition, wherein the hardener composition comprises an acid, and a phenolic resin which is a resorcinol resin or a tannin resin, or a mixture thereof.

2. A method according to claim 1, wherein the adhesive system is provided by separately applying the amino resin and the hardener composition onto the wood based materials.

3. A method according to claim 1, which comprises mixing the amino resin and the hardener composition to form the adhesive system and then providing the adhesive system onto the wood based materials.

4. A method according to claim 1, wherein the weight ratio amino resin to phenolic resin is from about 1 to about 15, based on dry matter.

5. A method according to claim 1, wherein the amino resin is a urea-formaldehyde resin.

6. A method according to claim 1, wherein the resorcinol resin is a phenol-resorcitol-formaldehyde resin.

7. A method according to claim 1, wherein method according to claim 1, wherein the acid is selected from the group of mono-, di-, tri- or polycarboxylic acids and sulphonic acids.

8. A method according to claim 1, wherein the pH of the hardener composition is from about 0 to about 4.

9. A method of gluing wood based materials by providing an adhesive system onto wood based materials followed by curing, the adhesive system comprising a urea based amino resin and a hardener composition, wherein the hardener composition comprises an acid, and a phenolic resin, the molar ratio aldehyde to amino compound used when making the urea based amino resin is less than 2.4.

10. A method according to claim 9, wherein the adhesive system is provided by separately applying the amino resin and the hardener composition onto the wood based materials.

11. A method according to claim 9, which comprises mixing the amino resin and the hardener composition to form the adhesive system and then providing the adhesive system onto the wood based materials.

12. A method according to claim 9, wherein the weight ratio amino resin to phenolic resin is from about 1 to about 15, based on dry matter.

13. A method according to claim 9, wherein the amino resin is a urea-formaldehyde resin.

14. A method according to claim 9, wherein the phenolic resin is a resorcinol resin or a tannin resin, or a mixture thereof.

15. A method according to claim 14, wherein the resorcinol resin is a phenol-resorcinol-formaldehyde resin.

16. A method according to claim 9, wherein the acid is selected from the group of mono-, di-, tri- or polycarboxylic acids and sulphonic acids.

17. A method according to claim 9, wherein the pH of the hardener composition is from about 0 to about 4.

18. A method of gluing wood based materials by providing a first and second component of an adhesive system onto wood based materials followed by curing, the first compronent is a urea based amino resin and the second component is a hardener composition, wherein the hardener composition comprises an acid, and a phenolic resin, the adhesive system is provided by separately applying the amino resin and the hardener composition onto the wood based materials.

19. A method according to claim 18, wherein the weight ratio amino resin to phenolic resin is from about 1 to about 15, based on dry matter.

20. A method according to claim 18, wherein the amino resin is a urea-formaldehyde resin.

21. A method according to claim 18, wherein the phenolic resin is a resorcinol resin or a tannin resin, or a mixture thereof.

22. A method according to claim 21, wherein the resorcinol resin is a phenol-resorcinol-formaldehyde resin.

23. A method according to claim 18, wherein the acid is selected from the group of mono-, di-, try- or pclycarboxylic acids and sulohonic acids.

24. A method according to claim 18, wherein the content of phenolic resin in the hardener composition is from about 20 to about 60 weight %, based on dry matter.

25. A method according to claim 18, wherein the content of the acid, including its salts, in the hardener composition is from about 2 to about 30 weight %.

26. A method according to claim 18, wherein the pH of the hardener composition is from about 0 to about 4.

27. A wood based product obtained by gluing wood based materials by providing an adhesive system onto wood based materials followed by curing, the adhesive system comprising a urea based amino resin and a hardener composition, wherein the hardener composition comprises an acid, and a phenolic resin which is a resorcinol resin or a tannin resin, or a mixture thereof.

28. A wood based product according to claim 27, which is a flooring material.

* * * * *